US009288783B2

(12) United States Patent
Kazmi et al.

(10) Patent No.: US 9,288,783 B2
(45) Date of Patent: Mar. 15, 2016

(54) METHODS AND APPARATUSES FOR REDUCTION OF INTERFERENCE DURING POSITIONING MEASUREMENTS

(71) Applicant: Telefonaktiebolaget L M Ericsson (publ), Stockholm (SE)

(72) Inventors: Muhammad Kazmi, Bromma (SE); Iana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/562,279

(22) Filed: Dec. 5, 2014

(65) Prior Publication Data
US 2015/0087338 A1 Mar. 26, 2015

Related U.S. Application Data

(63) Continuation of application No. 13/389,622, filed as application No. PCT/SE2010/050133 on Feb. 4, 2010, now Pat. No. 8,918,116.

(60) Provisional application No. 61/235,834, filed on Aug. 21, 2009.

(51) Int. Cl.
H04W 24/00 (2009.01)
H04W 64/00 (2009.01)
H04B 17/00 (2015.01)
H04B 17/382 (2015.01)
(Continued)

(52) U.S. Cl.
CPC ............ *H04W 64/00* (2013.01); *H04B 17/0077* (2013.01); *H04B 17/382* (2015.01); *H04W 24/08* (2013.01); *H04W 84/042* (2013.01)

(58) Field of Classification Search
CPC ............................ H04W 64/00; H04B 17/382
USPC ........................................ 455/456.1; 370/338
See application file for complete search history.

(56) References Cited

U.S. PATENT DOCUMENTS 8,812,017 B2 8/2014 Kangas et al.
2005/0277425 A1 12/2005 Niemela et al.
(Continued)

FOREIGN PATENT DOCUMENTS

CN 1985448 A 6/2007
EP 1 434 364 6/2004

OTHER PUBLICATIONS

3GPP TS 36.211 "3rd Generation Partnership Project; Technical Specification Group Radio Access Network; Evolved Universal Terrestrial Radio Access (E-UTRA); Physical Channels and Modulation (Release 10)," V10.4.0, Dec. 2011.
(Continued)

*Primary Examiner* — Marcos Batista
(74) *Attorney, Agent, or Firm* — Baker Botts, LLP

(57) ABSTRACT

The exemplary embodiments of the present invention relate to methods and apparatuses enabling reduction of interference in a wireless system in order to assist a user equipment in performing positioning measurements. According to exemplary embodiments of the present invention, a radio network node is configured to: receive a measurement report from the UE comprising signal quality measurements related to interfering cells; to select a set of most interfering cells and to determine a level of reduction of transmission activity to be executed at specific time for a determined duration.

4 Claims, 9 Drawing Sheets

(51) Int. Cl.
*H04W 24/08* (2009.01)
*H04W 84/04* (2009.01)

(56) References Cited

U.S. PATENT DOCUMENTS

| | | | |
|---|---|---|---|
| 2009/0046582 A1* | 2/2009 | Sarkar et al. | 370/230.1 |
| 2010/0195566 A1* | 8/2010 | Krishnamurthy et al. | 370/328 |
| 2011/0039577 A1* | 2/2011 | Stern-Berkowitz et al. | 455/456.1 |
| 2013/0315168 A1* | 11/2013 | Frank et al. | 370/329 |

OTHER PUBLICATIONS

3GPP TS 25.331 "3rd Generation Partnership Project; Technical Specification Group Radio Access Network; Radio Resource Control (RRC); Protocol Specification (Release 10)," V10.1.1, Apr. 2011.
First Office Action issued by the State Intellectual Property Office, P.R. China for Patent Application No. 201080038265.0, Apr. 2, 2014.
Federal Communications Commission, FCC 99-245, Before the Federal Communications Commission, Washington, D.C., In the matter of Revision of the Commission's Rules to Ensure Compatability with Enhanced 911 Emergency Calling Systems, CC Docket No. 94-102 RM-8143, "Third Report and Order," Released: Oct. 6, 1999, 59 pages.
3GPP TS 25.331 V8.6.0 (Mar. 2009), 3rd Generation Partnership Project; Technical Specification Group Radio Access Network; Radio Resource Control (RRC); Protocol Specification (Release 8), (c) 2009, 1,673 pages.
3GPP TS 25.214 V8.5.0 (Mar. 2009), 3rd Generation Partnership Project; Technical Specification Group Radio Access Network; Physical Layer Procedures (FDD) (Release 8), (c) 2009, 92 pages.
3GPP TS 36.211 V8.7.0 (May 2009), 3rd Generation Partnership Project; Technical Specification Group Radio Access Network; Evolved Universal Terrestrial Radio Access (E-UTRA); Physical Channels and Modulation (Release 8), (c) 2009, 83 pages.

* cited by examiner

METHODS AND APPARATUSES FOR REDUCTION OF INTERFERENCE DURING POSITIONING MEASUREMENTS

PRIORITY

This application is a continuation, under 35 U.S.C. §120, of U.S. application Ser. No. 13/389,622, filed Feb. 9, 2012, which is a U.S. National Stage Filing under 35 U.S.C. §371 of International Patent Application Serial No. PCT/SE2010/050133, filed Feb. 4, 2010 and published on Feb. 24, 2011 as WO 2011/021974 A1, which claims the benefit, under 35 U.S.C. §119(a), of U.S. Provisional Application Ser. No. 61/235,834, filed Aug. 21, 2009, all of which are incorporated herein by reference.

TECHNICAL FIELD

The present invention relates to methods and arrangements for positioning in a wireless communications network. In particular, it relates to interference coordination for positioning, location and location-based services.

BACKGROUND

User positioning, or identifying the geographical location of a user equipment (UE), has been widely used by a variety of services. Some services, e.g., emergency calls, are non-commercial and required by regulatory bodies, which may also impose accuracy requirements on the service. An example of this is the Federal Communications Commission (FCC) in the US; see FCC 99-245, "Revision of the Commission's rules to ensure compatibility with enhanced 911 emergency calling systems".

In many environments, the position of a UE can be accurately estimated by using positioning methods based on the Global Positioning System (GPS). However, GPS-based positioning may often have unsatisfactory performance in urban and/or indoor environments. A complementary positioning method could thus be provided by a wireless network. Positioning methods based on time difference of arrival measurements (TDOA) have been widely used, for example, in GSM, UMTS and cdma2000.

Positioning methods to be used in Evolved UMTS Terrestrial Radio Access Network (E-UTRAN) networks, sometimes referred to as Long-Term Evolution (LTE), have not yet been standardized but are actively discussed in 3GPP, where downlink user equipment (UE) assisted TDOA-based positioning (Observed TDOA, or OTDOA) is one of the possible candidates.

OTDOA is a downlink positioning method which exploits a so called multilateration technique to calculate the terminal position, based on TDOA measurements from three or more locations or sites. In general, multilateration, also known as hyperbolic positioning, is the process of locating an object based on time difference of arrival measurements conducted on signals between the object and three or more distinct locations. This implies that a UE needs to be able to hear, and correctly decode, signals from at least three different sites, e.g. three neighbouring base stations (eNodeBs).

In 3GPP it has been recognized that the hearability issue for signals, used for positioning measurements, need to be addressed to enable positioning services that meet the service requirements. Achieving the required accuracy is, in general, impossible with the, in E-UTRAN, currently standardized physical signals.

One problem with existing solutions is the low detection probability at low Signal-to-Noise Ratios (SNRs), which is common for signals from neighbouring cells due to low processing gain. Combined with the fact that their correlation properties are not sufficiently good to meet detection requirements, this results in inability to correctly decode the signal from a neighbour cell, in presence of a dominant interferer, e.g. close to the serving cell. Consequently, the positioning accuracy will be unsatisfactory.

In order to address the hearability issue and enhance positioning measurements, new physical signals, called positioning reference signals (PRS), in combination with low-interference subframes (LIS), during which no data is transmitted, have been proposed for the E-UTRAN.

For LTE, the PRS configuration, i.e. the transmission pattern; sequence, transmission; transmission bandwidth etc has been under discussion. It has however been agreed that cell-specific PRS patterns should allow a reuse factor of six, which is a likely solution for standardization to be specified in 3GPP TS 36.211. Thus, the PRS pattern can be decided to have a reuse factor of six. However, in real networks, a reuse factor of six may still not be enough for meeting the target positioning accuracy. Thus other interference mitigation techniques, particularly related to network planning, would be required to improve the hearability of signals from a sufficient number of distinct locations.

The strong-interferer problem typically occurs when measuring neighbour cells, which is necessary for positioning. In such cases it is not uncommon with a strong dominance of an interfering signal over the measured signal. Furthermore, the serving cell is not necessarily always the strongest interferer when measuring neighbour cells, for reasons that will be further explained below.

Another known approach to improve positioning measurements on neighbour cell is to apply idle-period downlink (IPDL) periods, which have been standardized for UMTS (3GPP TS 25.331, Radio Resource Control (RRC), Protocol Specification). With IPDL, base station (NodeB) transmissions are synchronously ceased for a short period. The idle periods are arranged in a predetermined pseudo-random fashion, according to higher layer parameters and the random pattern is known to all user equipments (UEs). The UEs are then required to perform measurements on neighbour cells during idle periods of the own base station.

There is no agreed solution to the identified problem yet for Evolved UMTS Terrestrial Radio Access Network (LTE). Adopting the UMTS IPDL solution in LTE is likely to result in unnecessary large performance degradation, which may occur due to the fact that:
- data transmissions must be ceased over a larger bandwidth in LTE than for UMTS (i.e. up to 20 MHz in LTE);
- control channel transmissions are affected, since during IPDL no transmissions are allowed; and also
- the measurement period may become longer for cells where IPDL is applied.

A key aspect to observe is that the serving cell is not necessarily the strongest interferer to all neighbour cells. The situation when the serving cell is not the strongest interferer may occur for the following reasons:
- some of the neighbour cell measurements e.g. signal quality such as Reference Signal Received Quality (RSRQ), which may also incorporate inter-cell interference, may not necessarily lead to the selection of the best cell, when the serving cell—or serving base station—is idle or partly idle.
- the UE may not be connected to the best cell all the time, e.g. due to measurement inaccuracy, which can be large.

For instance, Reference Signal Received Power (RSRP) absolute inaccuracy can be ±6 dB.

UE may not be connected to the best cell, due to certain radio resource management strategies: load balancing, intra/inter-RAT admission control, non-immediate handover, heterogeneous networks with selective user subscription policy, etc.

in real networks, some cells may generate stronger interference, e.g. because of difference in the cell sizes.

As explained above, if there is a strong interferer, other than the serving cell, hearability will be negatively impacted and the UE may, in order to perform positioning measurements, not be able to decode signals from neighbouring cells correctly. Thus, there is a need for improved positioning accuracy and/or performance enhancements.

SUMMARY

An object according to embodiments of the present invention is to alleviate at least some of the problems mentioned above. A further object according to some embodiments is to provide a mechanism for interference coordination in a wireless communications system. Yet other objects of some embodiments are to improve positioning accuracy and/or performance for a user equipment in a wireless communication system.

Thus, according to an aspect of exemplary embodiments of the present invention, at least some of the above stated problems are solved by means of a method in a radio network node enabling reduction of interference in a wireless communications system, in order to assist a user equipment in performing positioning measurements. The described method includes: receiving information comprising a set of signal quality measurements related to at least one signal, of at least one interfering cell, from the user equipment, which is being served by the radio network node; selecting a set of most interfering cells followed by determining, for each interfering cell in the set of most interfering cells a level of reduction of transmission activity of downlink signals. The reduction of transmission activity is to be executed at a specific time and for a determined duration by a radio network node serving the at least one interfering cell.

According to further aspect of exemplary embodiments of the present invention, at least some of the above stated problems are solved by means of a radio network node configured to enable reduction of interference in a wireless communications system in order to assist the user equipment in performing positioning measurements wherein the radio network node comprises a receiving circuit, configured to receive information comprising a set of signal quality measurements related to at least one signal of at least one interfering cell, from the user equipment being served by the radio network node. The radio network node further comprising a selection circuit configured to select a set of most interfering cells and determination circuit configured to determine, for each interfering cell in the set of most interfering cells, a level of reduction of transmission activity of downlink signals, to be executed at a specific time and for a determined duration by a radio network node serving the at least one interfering cell.

Further is disclosed, according to a further aspect of exemplary embodiments of the present invention, a method in a network node, enabling reduction of interference in a wireless communications system in order to assist a user equipment in performing positioning measurements, wherein the method comprises receiving a message comprising information relating to a level of interference of at least one interfering cell, from a radio network node serving the user equipment, the method further includes selecting a set of most interfering cells and determining, for each interfering cell in the set of most interfering cells, a level of reduction of transmission activity of downlink signals, to be executed at a specific time and for a determined duration by a radio network node serving the at least one interfering cell.

The above is further achieved by, according to a further aspect of embodiments of the present invention, a network node which is configured to enable reduction of interference in a wireless communications system in order to assist a user equipment in performing positioning measurements, comprising a receiving circuit, configured to receive a message comprising information relating to a level of interference of at least one interfering cell, from a radio network node serving the user equipment. The network node further comprises a selection circuit, configured to select a set of most interfering cells and a determination circuit configured to determine, for each interfering cell in the set of most interfering cells, a level of reduction of transmission activity of downlink signals used for positioning measurements, to be executed at a specific time and for a determined duration by a radio network node serving the at least one interfering cell.

Also is disclosed, according to a further aspect of embodiments of the present invention, a method in a user equipment for performing positioning measurements on at least three interfering cells, the method comprises measuring a reference signal from the interfering cells and for each interfering cell, detecting an absence of a positioning reference signal (PRS) indicative of a reduction in transmission activity from the interfering cells and switching from measuring positioning measurements on a positioning reference signal (PRS) to measuring on a cell-specific reference signal (CRS).

It is further disclosed, according to a further aspect of embodiments of the present invention, a user equipment, which is configured to perform positioning measurements on at least three interfering cells i.e. on a set comprising at least three interfering cells. The user equipment comprising a measuring circuit, configured to measure a reference signal from the set of the interfering cells, and a detection circuit configured to detect, for each interfering cell, an absence of a positioning reference signal (PRS) indicative of a reduction in transmission activity from the interfering cells. The user equipment further comprises a switching circuit which is configured to switch from measuring positioning measurements on a positioning reference signal (PRS) to measure on a cell specific reference signal (CRS) for each interfering cell, and a measuring circuit configured to measure on a cell specific reference signal (CRS) for each interfering cell.

An advantage of embodiments of the present invention is that positioning measurement performance and accuracy for user equipments in the system is increased due to improvement of interference coordination or interference reduction.

A further advantage is the reduction of user equipment power consumption and complexity, since the user equipment more easily can detect neighbouring cells.

Yet another advantage of embodiments of the present the invention is that it allows positioning measurements to be performed/done faster, i.e. during a shorter time period.

ABBREVIATIONS

CRS Cell-specific Reference Signal
eNodeB evolved NodeB
eSMLC Enhanced Serving Mobile Location Center
E-UTRAN Evolved UMTS Terrestrial Radio Access Network
IPDL Idle Period Downlink
LTE Long-Term Evolution
OTDOA Observed Time Difference of Arrival
PRS Positioning Reference Signal
RSRP Reference Signal Received Power
RSRQ Reference Signal Received Quality
SNR Signal-to-Noise Ratio
SMLC Serving Mobile Location Center
TDOA Time Difference of Arrival
UE User Equipment
UMTS Universal Mobile Telecommunications System

DETAILED DESCRIPTION

According to embodiments described below, the wireless communications system/network is able to temporarily reduce the transmission activity of one or more interfering cells, which may be different from the serving cell, in order to assist an individual user equipment, or a group of user equipments, in performing positioning measurements with sufficient accuracy. This requires communication and signalling between the radio network nodes, as will be explained in more detail below.

Reducing transmission activity of e.g. downlink signals could mean, for example, not transmitting or reducing power of one or more positioning reference signal (PRS) in positioning subframes in a specified set of resource blocks (RBs) or over an entire set of RBs. Transmission activity could also be reduced only for certain downlink channels e.g. only for the broadcast channel. Thus, in an embodiment, a method in a radio network node or in a network node is provided comprising determining one or more strongest interfering cells, which may be different than the serving cell, and reducing the transmission activity in the determined cells to facilitate positioning measurements.

An exemplary procedure comprises three main aspects, which will also be described in more detail below, namely:
methods for determining interfering cells;
signalling mechanism for reducing transmission activity in interfering cells; and
measurement procedure under reduced transmission activity.

Figure 1:
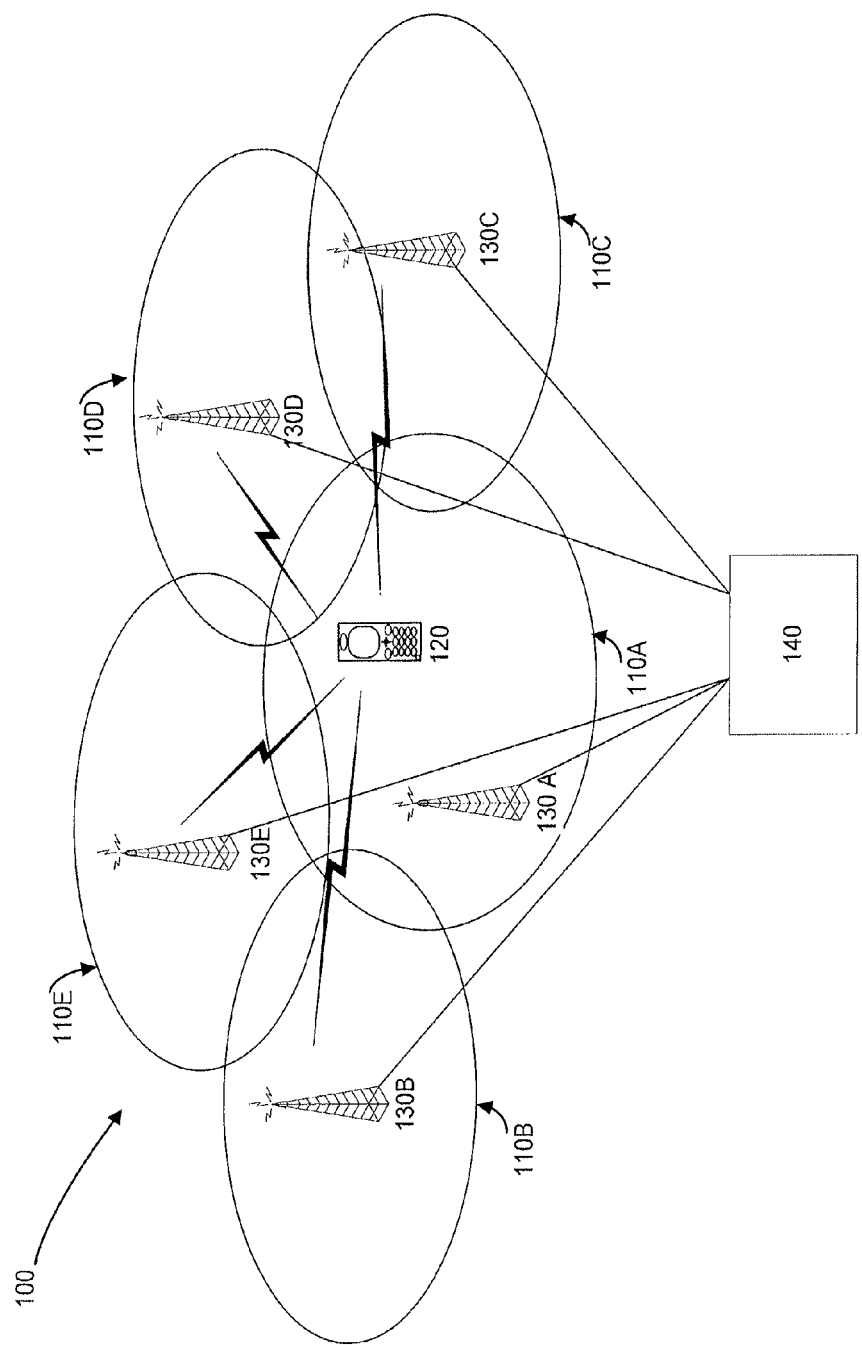
FIG. 1 is a diagram illustrating a part of a cellular wireless communications system wherein the embodiments of the present invention may be implemented.

FIG. 1 illustrates a part of an exemplary cellular wireless communications system/network 100 such as LTE in which embodiments of the present invention may be implemented. A cell is being denoted 110, a base station (eNodeB) covering/serving the cell 110 is denoted 130 and a user equipment (UE) is denoted 120 in FIG. 1. Note that in FIG. 1, the number of base stations, the number of cells and the number of user equipments (UEs) are exemplary only i.e. the exemplary embodiments of the present invention are not restricted to any particular number of base stations and/or cells and/or UEs etc.

The UE 120 in the serving cell 110A needs to perform positioning measurements/calculations on measurement signals of cells 110B-110E in the neighbourhood of the serving cell 110A. It should however be noted that the cells 110B-110E are not necessarily strictly adjacent cells. The positioning calculations may be performed by a positioning node 140 in the cellular wireless communications system 100 and the positioning node 140 may be an integral part of an eNodeB, as a functional entity/node, or it may be a separate node in the network. It should be mentioned that the connection between eNodeBs 130A-130E and the positioning node 140 can be logical i.e. the connection is not necessarily physical. As an example, in LTE there could exist at least one node between positioning node 140 and eNodeBs 130A-130E and that a positioning protocol can operate transparently to that at least one node, so positioning node 140 and eNodeBs 130A-130E can be logically connected via that protocol.

Figure 2:
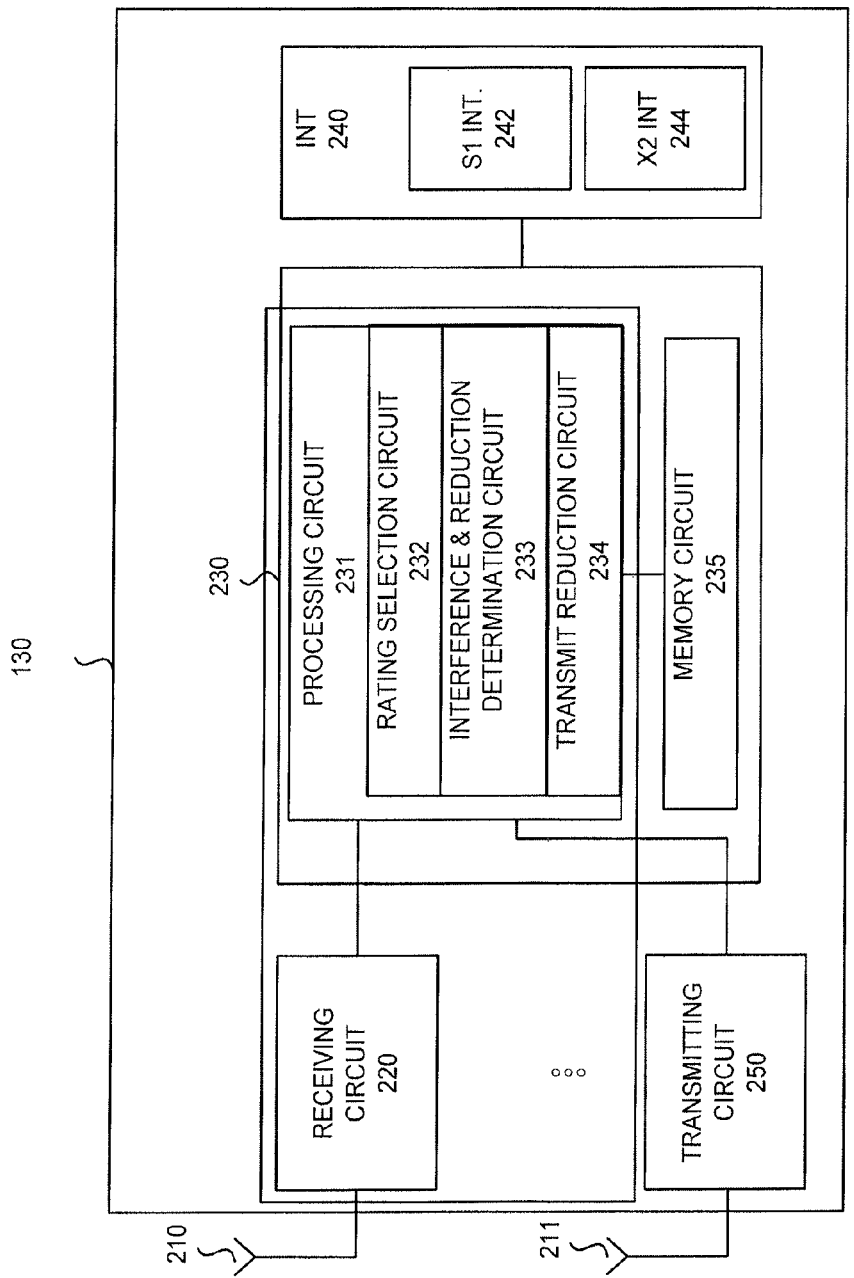
FIG. 2 is a block diagram illustrating a radio network node according to an embodiment of the present invention.

FIG. 2 is a block diagram of exemplary components of a radio network node 130 also denoted below eNodeB 130. As illustrated, eNodeB 130 includes antennas 210, 211, receivers or receiving circuit/unit 220, transmitters or transmitting circuits/unit 250, a processing system 230, and an interface 240.

The antennas 210, 211 include one or more directional and/or omni-directional antennas. The receiver 220 and the transmitter 250 are associated with antennas 210, 211 and include transceiver circuitry for transmitting and/or receiving symbol sequences in a network, such as network described in FIG. 1, via antennas 210, 211.

The processing system 230 controls the operation of the eNodeB 130, and the processing system 230 also processes information received via transmitters/receivers 250, 220 and interface 240. As illustrated, the processing system 230 includes processing circuit/unit or processing logic 231 and a memory circuit/unit 235. It will be appreciated that processing system 230 may include additional and/or different components than illustrated in FIG. 2. For instance, processing logic 231 may include a processor, microprocessor, an ASIC, FPGA, or the like. The processing logic 231 processes information received via transmitter 250 and receiver 220 and interface 240. The processing may include, for example, data conversion, forward error correction (FEC), rate adaptation, spreading/dispreading, quadrature phase shift keying (QPSK) modulation, etc. In addition, processing logic 231 may generate control messages and/or data messages and cause those control messages and/or data messages to be transmitted via transmitter 250, receiver 220 and/or interface 240. Processing logic 231 may also process control messages and/or data messages received from transmitter 250, receiver 220 and/or interface 240. Memory unit/circuit 235 may include a RAM (Random Access Memory), a ROM (Random Only Memory), and/or another type of memory, such as a hard drive, to store data and instructions that may be used by processing logic 231.

As will be exemplified and described in more details, the eNodeB 130 or generally the radio network node 130, according to embodiments of the present invention, is configured to enable reduction of interference in a wireless communication system, in order to assist a UE in performing positioning measurements. For that purpose and according to exemplary embodiments of the present invention, the radio network node 130, which can be anyone of eNodeBs 130A-130E of FIG. 1, serving a cell, is configured, by means of the receiving circuit 220 to receive, from at least one UE it serves, information comprising a set of signal quality measurements in e.g. a measurement report. The signal quality measurements relate to at least one signal of at least one interfering cell. The processing logic 231 is configured to process the received information to determine, for at least one interfering cell, a level of interference. After determination of the at least one level of interference, a rating selection circuit 232 of the radio network node 130 is configured to select a set of most interfering cells. The rating selecting circuit 232 is shown, in FIG. 2, as part of the processing logic 230 although not necessarily i.e. the rating circuit 232 may instead be connected to the processing logic 230. According to an embodiment of the present invention, the rating selection circuit 232 is further configured to rate the set of most interfering cells by their importance with respect to accuracy of the positioning measurements performed by the UE. The rating is based on the set of signal quality measurements for each interfering cell. Additional details on the rating operation will be described later.

When the set of most interfering cells has been determined, an interference and reduction determination circuit/unit 233 of the radio network node 130 is configured to determine, for each interfering cell in the set of most interfering cells, a level of reduction of transmission activity of downlink signals to be executed at a specific time and for a determined duration by the radio network nodes serving the at least one interfering cell. For this purpose, the radio network node 130 comprises a transmit reduction unit/circuit 234 which is configured to transmit, via transmitting circuit 250, reduction instructions comprising the information on level of reduction of transmission activity of the downlink signals to the radio network nodes serving the at least one interfering cell. According to a further embodiment of the present invention, the reduction instructions are transmitted, by means of the transmit reduction circuit 234 via transmitting circuit 250, to a network node i.e. the positioning node 140 of FIG. 1, enabling the positioning node 140 to instruct the radio network node or radio network nodes serving the at least one interfering cell to reduce transmission activity of the downlink signals or of downlink channels comprising the downlink signals.

Referring back to FIG. 2, interface 240 may include one or more line cards that allow the radio network node or eNodeB 130 to transmit data to and receive data from other devices over wired and/or wireless connections. As illustrated, interface 240 includes an S1 interface 242 that allows eNodeB 130 to communicate, for example, with a MME/GW (Mobility Management Entity/GateWay), and an X2 interface 244 that allows eNodeB 130 to communicate with other eNodeBs. Both the S1 and the X2 interfaces are standard interfaces.

It should be noted that eNodeB 130 may perform operations in response to processing logic 231 executing software instructions contained in a computer-readable medium, such as memory 235. A computer-readable medium may be defined as one or more physical and/or logical memory devices. The software instructions may be read into memory 235 from another computer-readable medium or from another device via interface 240. The software instructions contained in memory 235 may cause processing logic 231 to perform processes described herein. Furthermore, hardwired circuitry may be used in place of, or in combination with, software instructions to implement processes described herein.

Figure 3:
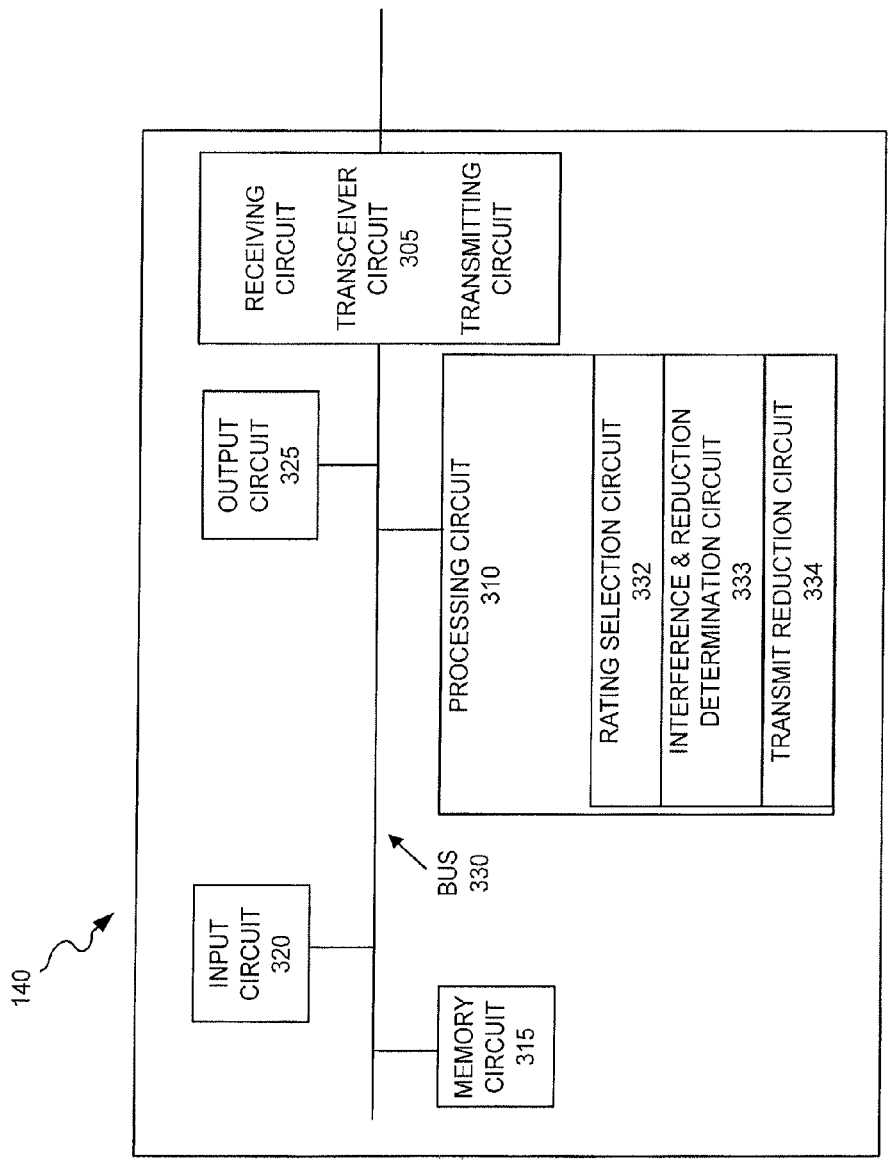
FIG. 3 is a block diagram illustrating a network node according to an embodiment of the present invention.

Referring to FIG. 3 there is illustrated an exemplary implementation of previously mentioned positioning node 140 or generally network node 140. The positioning node 140 is implemented as a separate and stand-alone hardware node, however, the positioning node 140 may be implemented as an integral part of eNodeB 130 of FIG. 2 or as a functional node in any, for the purpose, suitable node.

As illustrated, positioning node 140 includes a transceiver unit/circuit 305, processing unit/circuit 310, denoted below processing logic, a memory circuit 315, input circuit 320, output circuit 325, and a bus 330.

Transceiver circuit 305 is shown including a transmitting circuit that may convert signals from processing logic 310 to signals suitable for S1/X2 interface or other suitable interface. The transceiver circuit 305 also includes a receiving circuit that may convert received signals to baseband signals. Transceiver circuit 305 may include a transceiver to perform functions of both a transmitter and a receiver. The transceiver circuit 305 is configured to transmit data to and receive data from other devices over wired and/or wireless connections. The transceiver circuit 305 of the positioning node 140 is connectable to the S1/X2 interface for transmission and/or reception of signals which can be control signals as well as data signals or a combination thereof. The S1 interface allows the positioning node 140 to communicate, for example, with the MME/GW, and the X2 interface allows positioning node 140 to communicate with eNodeBs.

Processing logic 310 may include a processor, microprocessor, an application specific integrated circuit (ASIC), field programmable gate array (FPGA), or the like. Processing logic 310 controls the operation of positioning node 140.

Memory circuit 315 may include a RAM, ROM, and/or another type of memory, such as a hard drive, to store data and instructions to be used by processing circuit 310. Input circuit or input device(s) 320 may include mechanisms for entry of data into positioning node 140. Bus 330 is shown interconnecting the various components of positioning node 140 to permit the components to communicate with one another.

In embodiments according to the present invention, the positioning node 140 i.e. network node 140 is configured to enable reduction of interference in wireless system, in order to assist a UE in performing positioning measurements, the UE being served by a radio network node i.e. eNodeB 130 according to previously described embodiments of the present invention in conjunction with FIG. 2. For enabling reduction of interference and according to embodiments of the present invention, the network node 140 is configured, by means of receiving circuit of transceiver unit 305, to receive from the radio network node 130 a message comprising information relating to a level of interference of at least one interfering cell. The processing logic 310 is configured to process the received information. After processing of the information, a rating selection circuit 332 of the network node 140 is configured to select a set of most interfering cells. The rating selecting circuit 332 is shown, in FIG. 3, as part of the processing logic 310 although not necessarily i.e. the rating circuit 332 may be connected to the processing logic 310. According to an embodiment of the present invention, the rating selection circuit 332 is further configured to rate the set of most interfering cells by their importance with respect to accuracy of the positioning measurements performed by the UE. The rating is based on information in the received message. Additional details on the rating operation will be described later. When the set of most interfering cells has been determined, an interference & reduction determination circuit/unit 333 of the network node 140 is configured to determine, for each interfering cell in the set of most interfering cells, a level of reduction of transmission activity of downlink signals to be executed at a specific time and for a determined duration by the at least one radio network node serving the at least one interfering cell. For this purpose, the network node 140 comprises a transmit reduction unit/circuit 334 which is configured to transmit a message comprising information relating to time and duration of transmission activity to the at least one radio network node serving the at least one interfering cell. This will enable the radio network node(s) to reduce transmission activity of the downlink signals at the indicated time and duration.

In order to further explain the embodiments of the present invention, a simplified signalling scheme is described below in conjunction with FIG. 4A. In this exemplary scheme, it is considered the case where the radio network node i.e. eNodeB 130A, in accordance with previously described embodiments of the present invention, is enabled to reduce interference in a wireless communication system in order to assist a UE 120 in performing positioning measurements.

Figure 4A:
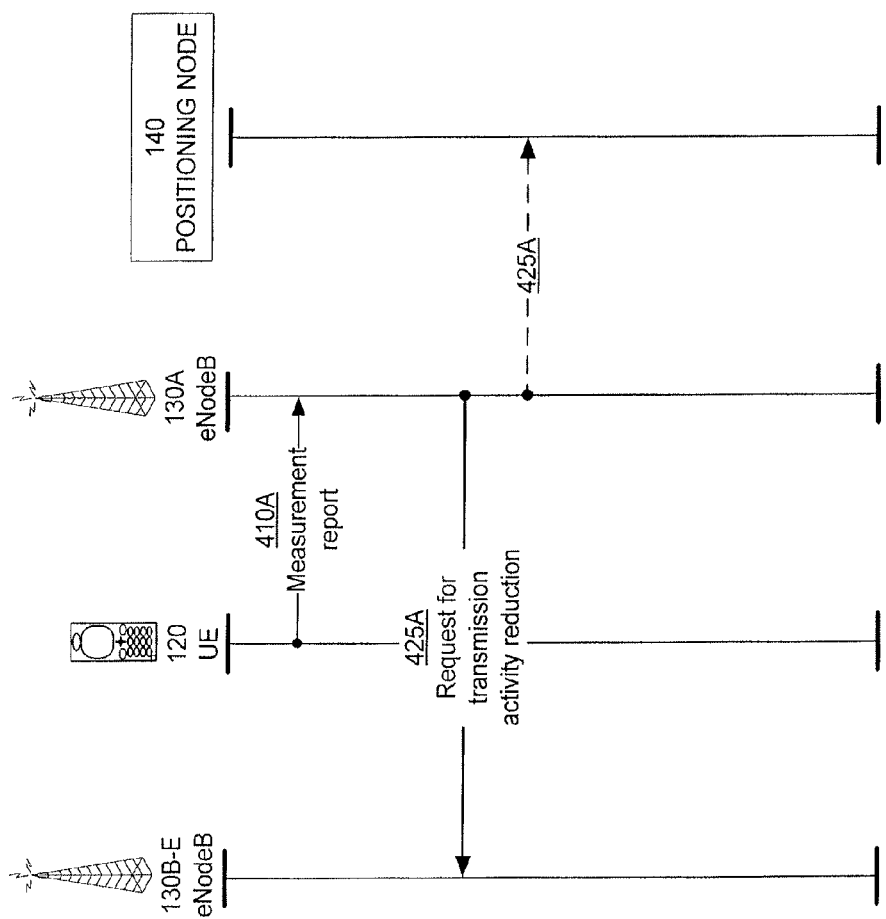
FIG. 4A illustrates a signalling scheme according to an exemplary embodiment of present invention.

In FIG. 4A, UE 120 is considered served by eNodeB 130A. For easier understanding of this signalling scheme only a single UE, UE 120, is assumed served by eNodeB 130A, even though in real networks, a eNodeB will generally serve a plurality of UEs.

Referring to FIG. 4A, the UE 120 performs measurement(s) on suitable downlink signals and sends a measurement report 410A its serving eNodeB 130A. The information in the measurement report comprises a set of signal quality measurements related to at least one signal of at least one interfering cell (not shown), which can be anyone of cells 110A-110E (of FIG. 1) or some of cells 110A-110E or all of cells 110A-110E. Each cell 110A-11E is, as previously described in conjunction with FIG. 1, served by a respective eNodeB 130A-130E. It is clear from FIG. 1 that cells 110B-110E are neighbouring cells to serving cell 110A. Referring back to FIG. 4A, the eNodeB 130A determines, based on the information in the received report, a level of interference for the at least one interfering cell and selects a set of most interfering cells. The eNodeB 130A then determines for each interfering cell in the set of most interfering cells a level of reduction of transmission activity of downlink signals and transmits, to each eNodeB 130B-130E serving an interfering cell in the set of most interfering cells, a message 425A comprising information on level of reduction of transmission activity of downlink signals used for positioning measurements. Message 425A can be viewed as a request for transmission activity reduction as indicated in FIG. 4A. This enables the eNodeBs 130B-130E that receive the message 425A to perform or coordinate interference reduction/coordination. In FIG. 4A, a network node corresponding to a positioning node 140 is also depicted. This positioning node 140 is, as previously described and according to an embodiment of the present invention, may also configured to receive, from eNodeB 130A, the message 425A comprising information on level of reduction of transmission activity of downlink signals used for positioning measurements, as illustrated in dashed arrow in FIG. 4A. Note however, that since in this illustrative exemplary embodiment, the eNodeB 130A is responsible in sending message 425A to the other eNodeBs 130B-130E, the positioning node 140 does not necessarily receive message 425A. Additional details on how the serving cell 110A or the serving eNodeB 130 processes the set of most interfering cells will be described later.

Figure 4B:
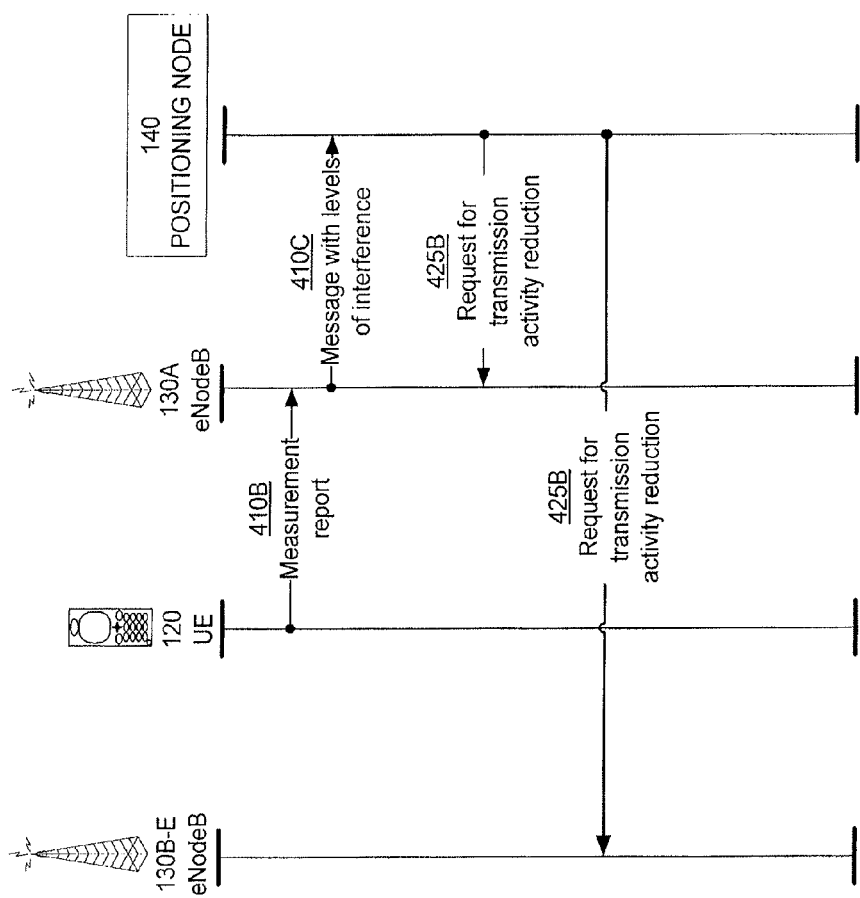
FIG. 4B illustrates a signalling scheme according to another exemplary embodiment of present invention.

FIG. 4B illustrates a simplified signalling scheme wherein the positioning node 140 is enabled to reduce interference in a wireless communication system in order to assist UE 120 in performing positioning measurements, in accordance with previously described embodiments of the present invention. Similarly to the scheme described in conjunction with FIG. 4A, UE 120 is also here considered served by eNodeB 130A. Furthermore and for easier understanding of this scenario only a single UE 120 is assumed served by eNodeB 130A, even though in real networks, a eNodeB will generally serve a plurality of UEs.

The UE 120 performs measurement(s) on suitable downlink signals and sends a measurement report 410B to the serving eNodeB 130A, as previously described. The eNodeB 130A then determines a level of interference for at least one interfering cell and transmits, to the positioning node 140, a message 410C comprising information relating to a level of interference for the at least one interfering cell. It should be noted that the positioning node 140 is not restricted to receiving the message comprising information relating to a level of interference from only eNodeB 130 i.e. the positioning node 140 can receive, from each eNodeB 130B-130E a message comprising information relating to a level of interference. However, for easier understanding of the signalling scheme of FIG. 4B, only a single message 410C is received by positioning node 140 from eNodeB 130A.

When the positioning node 140 receives message 410C, the positioning node 140 selects a set of most interfering cells and determines for each interfering cell in the set of most interfering cells a level of reduction of transmission activity of downlink signals. It should be mentioned that the positioning 140 may, instead of or in combination with the eNodeB 130A, determine the set of most interfering cells. Referring back to FIG. 4B, the positioning node 140 transmits to each eNodeB 130A-130E serving an interfering cell in the set of most interfering cells, a message 425B comprising information on level of reduction of transmission activity of downlink signals used for positioning measurements. Also in this scheme, message 425B can be viewed as a request for transmission activity reduction as indicated in FIG. 4B. This enables the eNodeBs 130A-130E that receive the message 425B or the request to perform or coordinate interference reduction/coordination.

As described earlier and above, the set of one or more strongest interfering cells is determined. The serving eNodeB or the serving cell currently serving the UE or UEs is not necessarily the strongest interferer. Also described earlier and above is that the eNodeB or the positioning node is configured to reduce the transmission activity in the determined cells to facilitate positioning measurements. Thus, in the following will be described, as part of the exemplary embodiments of the present invention:

an approach by which a serving cell or a serving eNodeB is not necessarily interpreted as the strongest interferer for a UE. Therefore, in this case, the UEs are not forced to perform positioning measurements for neighbouring cells while the serving cell is idle;

an algorithm and metrics for indicating strong interferers in the context of positioning;

two algorithms, one distributed and one centralized for interference coordination for positioning; and communication between radio network nodes i.e. base stations or eNodeBs, or. between base stations and a network node i.e. a positioning node or positioning server, to support distributed interference coordination for positioning. A positioning node can be an enhanced Serving Mobile Location Center (eSMLC).

As previously described in conjunction with FIGS. 4A-4B, each UE performs a set of signal quality measurements for the serving cell and interfering/neighbour cells and reports to the serving radio network node. The measurements are performed, for example, on a suitable pilot signal or cell-specific reference signals. Existing procedure and methods, according to standard protocol, for performing measurements and reporting them to the network can be reused. For example, in LTE, the UE could measure reference signal received power (RSRP) or reference signal received quality (RSRQ) in LTE. The reports can, for instance, be based on an absolute signal quality, or a relative signal quality, e.g., with respect to the strongest interferer or the serving cell. According to standard protocol, these types of measurements i.e. absolute signal quality and relative signal quality can be reported by the UE. In other words, the exemplary embodiments of the present invention can make use of the already defined signal quality measurements. Let the set of signal quality measurements, also denoted here metrics, for $UE_i$ be defined as $$Q_i = \{q_{n_{i,0}}, q_{n_{i,1}}, \ldots, q_{n_{i,j}}, \ldots, q_{n_iN_i}\}.$$

Where $q_{n_{i,j}}$ is the signal quality of a cell with cell ID=$n_{i,j}$ measured by $UE_i$, such that j=0 corresponds to the serving cell of $UE_i$, j=1, . . . , $N_i$ is the j-th neighbour of $UE_i$, and $N_i$ is the number of neighbour cells measured by $UE_i$.

The list of the cells to be measured is communicated to the UE by the network as a part of the assistance data. The network which can be the network depicted in FIG. 1, can also reuse the traditional measurement reports sent by the UE for mobility purposes.

Let now $\Omega_i$ be the set of cells that have a strong negative impact on positioning accuracy for $UE_i$. The set $\Omega_i$ can be defined, for example, by one of the following approaches:

select a predefined number of strongest interferers i.e. a subset of cells $\{n_{i,j}, j=0, \ldots, N_i\}$ of the given size with the largest $q_{n_{i,j}}$ values. Note that one strongest interferer is then a special case; or select interferers with the signal quality satisfying $q_{n_{i,j}} \geq \gamma$, where $\gamma$ is a given threshold. Note here that $\Omega_i$ can be empty if no cell has a signal quality above the threshold.

Different UEs may have different sets of selected interferers. The decision, of which cells or radio network nodes or eNodeBs in the network should reduce their transmission activity, at what time and for how long, may be made by a Radio Resource Management (RRM) algorithm i.e. it can be up to the RRM algorithm to decide which cells in the network should reduce their transmission activity, at what time and for how long.

A method for determining which cells should reduce their transmission activity comprises the following steps, according to an exemplary embodiment of the present invention:

UE performs signal quality measurements on the serving and neighbour cells i.e. on the serving radio network node and neighbouring radio network nodes.

UE reports the measurements to the serving cell.

The serving cell collects the measurement reports from own UEs and calculates the elements of set $Q_i$ for each $UE_i$.

The serving cell creates a subset $\Omega_i$ of strong interferers for each $UE_i$.

The serving cell processes the sets $\Omega_i$ from all user equipments it serves, or from a subset of user equipments, for example those user equipments showing the worst performance, and rates all the interferers by their importance with respect to positioning accuracy. Different mechanism could be used to calculate the rating factors. For example strong interferers of UEs with the worst positioning performance may get larger weights. For instance, if a certain UE does not report a high enough signal quality for at least three other cells, then the radio network node may conclude that the UE has bad positioning performance, since measurements from at least three cells are required to perform positioning. The strongest interferer or interferers of that UE could then be rated higher.

For a given cell k, let $r_{k,c}$ be the importance factor of cell c, where c is the ID of a cell that appears in the set $\Omega_i$ for at least one $UE_i$ served be the cell k. Let $R_k$ be the set of rates selected in cell k and $ID_k$ is the set of the corresponding cell IDs. The set ($R_k$, $ID_k$) are then used to decide which cells will reduce their transmission activity during the next positioning occasion. It should be noted that during the positioning occasion a set of signals such as positioning reference signals (PRS), which are used by the UE to perform positioning measurement, e.g. time difference of arrival of signals, are transmitted by the radio network node. In one exemplary embodiment, each factor $r_{k,c}$ can take on one of two values: no or full allowed transmission activity. That is to say, if the corresponding cell with $id_c$ is considered to be an important interferer with respect to cell k, then $r_{k,c}$ would be set to 0, indicating that cell k requests that there should be no transmission in the cell with $id_c$. In another embodiment $r_{k,c}$ can take on multiple values, corresponding to multiple levels of transmission activity, e.g. no transmission activity, low transmission activity, medium transmission activity and normal or full transmission activity. In a further exemplary embodiment the set includes another set $C_k$ indicating the set of channels or carriers which should operate at lower activity or whose activity level could be specified, e.g. $c_0$ means that the broadcast channel should be transmitted with low activity. In this exemplary embodiment, the set ($R_k$, $ID_k$, $C_k$) would be used to decide which cell should reduce transmission activity, and on which channel or channels the activity should be reduced. This could be useful in cases where special data, such as System Information (SI), from cell k interferes with $UE_i$.

The above algorithm can be implemented in the radio network node in accordance with embodiments of the present invention, such as eNodeB 130 previously described and illustrated, or in a network node according to previously described embodiments of the present invention, such as the positioning node 140, e.g. SMLC server or eSMLC server. In the latter case the measurement reports are to be signalled or forwarded to the SMLC server by the radio network node i.e. by the eNodeB 130. Yet another possibility is that both radio network node 130 and positioning node 140 are involved in determining, the interfering cells. For example in this case the positioning node can configure the radio network node with some parameters for determining the interfering cells. The determination can be done in the radio network node.

Once the positioning node i.e. the network node or the radio network node, has determined the interfering cell or cells using the mechanism described above, the next step is to reduce the transmission activity, if required, in one or more of the determined interfering cells. The radio network node or the network node then transmits a message comprising information relating to the level of interference and the at least one interfering cell to the other radio network node or nodes, thereby enabling the second network node to perform interference coordination. In order to be able to transmits the message signalling over interfaces between the nodes is required. This could be done using either a distributed or a centralized approach which are described below.

In a distributed approach, a set of information which would enable the reduction of transmission activity in the interfering cells is directly exchanged between the radio network nodes. For example, the information to be exchanged between a pair of radio network nodes can be the set ($R_k$, $ID_k$) or the set ($R_k$, $ID_k$, $C_k$) described earlier. For example, information is exchanged only between pairs of radio network nodes within a certain range of each other, in order to avoid flooding. Then in response to and based on the exchanged information each radio network node can locally decide whether to reduce its transmission activity or not. In an embodiment, a radio network node decides to reduce its transmission activity in cell i if within a certain time limit it has not received any set ($R_k$, $ID_k$) with $$R_k - R_i \geq \epsilon,$$

Where $\epsilon$ could either be a network controlled parameter i.e. signalled by the network or predefined in the standard. For instance, assume that the set $R_k$ comprises the values ({0, $ID_1$}, {0.5, $ID_2$}, {0.5, $ID_3$}). The set $R_i$ comprises the values ({1, $ID_1$}, {0, $ID_2$}, {0.5, $ID_3$}). When calculating $R_k - R_j$, the radio network node performs element-wise subtraction for the elements corresponding to the same cell, i.e. $R_k - R_i = $({0-1, $ID_i$}, {0.5-0, $ID_2$}, {0.5-0.5, $ID_3$})=({-1, $ID_1$}, {0.5, $ID_2$}, {0, $ID_3$}). Thus, if $\epsilon=0.3$, then the radio network node will reduce its transmission activity in cell $ID_2$, but not in any of the other cells.

In an embodiment, the positive decision can be made with a certain probability, which is increasing after a negative decision in cells that are identified by other cells as a strong interferer. Stated another way, if the radio network node makes a decision not to lower its transmission activity, e.g. because at that moment $R_k - R_i < \epsilon$ for all sets $R_k$, then the probability increases that at the next decision instance or at the next occasion, it will decide to lower its transmission activity.

This mechanism can be used in LTE where information can be exchanged between the radio network nodes i.e. eNodeBs over the X2 interface. The method is particularly applicable in case the determination of the interfering cells is done by the serving eNodeB. Note that the distributed approach can in principle also be used in case the determination of interfering cells is done by the positioning or location server. In this case the eNodeB have to be first configured by the positioning or location server. In one embodiment, the UEs are also instructed about the cells over which they shall perform positioning measurements and during which time period e.g. while the transmission activity on the interfering cells is lowered.

As previously described, a centralized mechanism can be used. In the centralized mechanism the network node, i.e. the positioning node, such as an SMLC server, directly signals the one or more interfering cells instructing them to reduce their transmission activities. The interfering cells can, as previously described, be the serving cell and/or one or more neighbouring cells. Either the positioning node has a full set of information of the interfering cell i.e. which cells are interfering or it acquires this information from the radio network nodes i.e. from the eNodeBs. For instance, in the latter case the radio network nodes transmit information about their rated neighbour cells and the corresponding rates, i.e. cell k would transmit ($R_k$, $ID_k$) or ($R_k$, $ID_k$, $C_k$), to a coordinating unit i.e. the positioning node e.g. SMLC server. The coordinating unit in turn decides which cells should reduce their transmission activity and informs the corresponding cells.

The determination of which cells should reduce transmission activity may be performed in an analogous manner to the distributed embodiment described earlier. The UEs are also instructed about the cells over which they shall perform positioning measurements and during the time period when the transmission activity on the interfering cells is lowered.

Hitherto, exemplary embodiments of the present invention have been described in relation to a radio network node and a network node respectively. Before describing embodiments of the present invention concerning a UE; a procedure relating the UE and to positioning measurements in the UE when transmission activity is reduced, the main steps performed by the radio network node and the network node respectively are hereinafter summarized in conjunction with FIG. 5 and FIG. 6.

Figure 5:
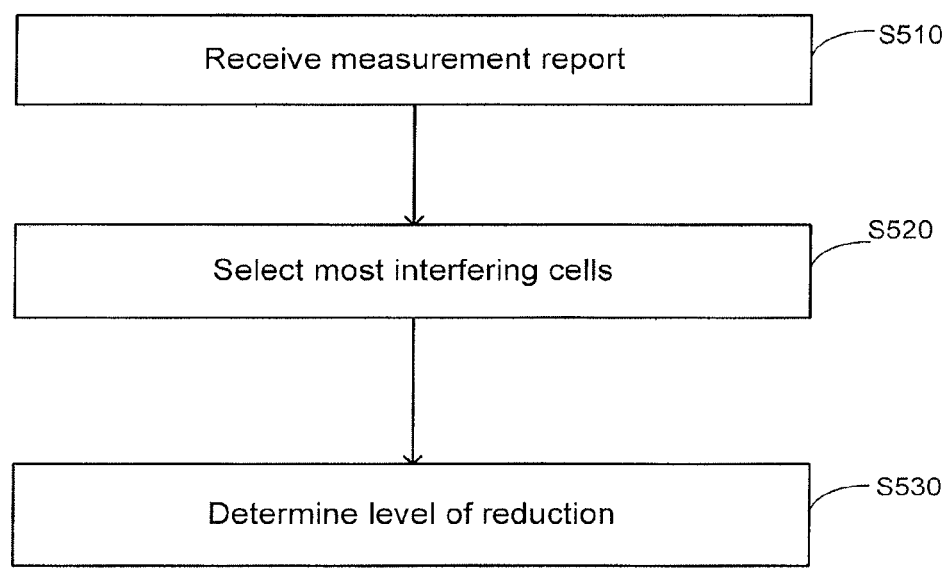
FIG. 5 is a flowchart illustrating main method steps performed by a radio network node according to embodiments of the present invention.

Referring to FIG. 5, there is depicted the main steps performed by a radio network node e.g. eNodeB in accordance with the previously exemplary embodiments of the present invention. The main steps performed by the radio network node comprise:

S510: Receiving, from at least one UE served by the radio network node, information comprising a set of signal quality measurements related to at least one signal of at least one interfering cell. The information is received in a measurement report as indicated in S510;

S520: selecting a set of most interfering cells; and

S530: determining a level of reduction by determining, for each interfering cell in the set of most interfering cells, a level of reduction of transmission activity of downlink signals, to be executed at a specific time and for a determined duration by a radio network node serving said at least one interfering cell.

A detailed description on how steps S510, 520 and S530 are performed and by what means of the radio network node have already been thoroughly described and are therefore not repeated unnecessarily. The additional involved functions and steps performed by the radio network node, according to exemplary embodiments of the present invention, such as rating etc. have also already been described and are therefore not repeated again.

Figure 6:
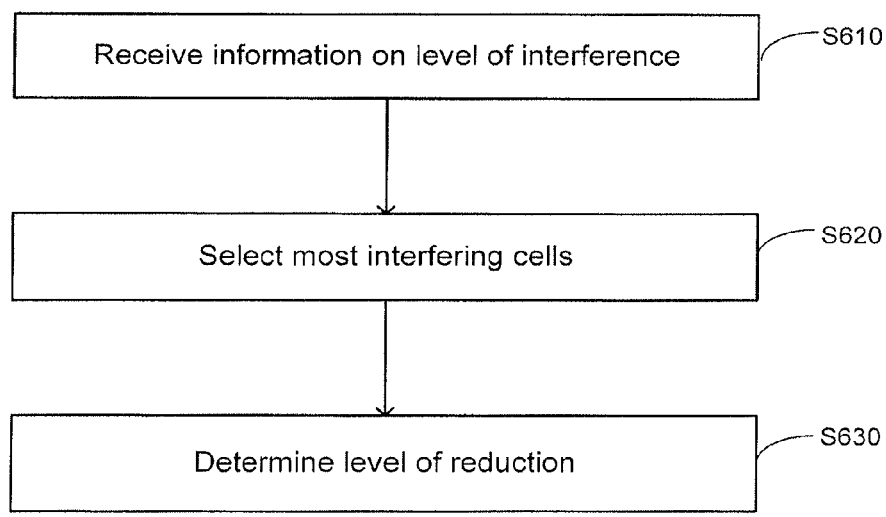
FIG. 6 is a flowchart illustrating main method steps performed by a network node according to embodiments of the present invention.

Referring to FIG. 6, there is depicted the main steps performed by a network node e.g. positioning node in accordance with the previously exemplary embodiments of the present invention. The main steps performed by the radio network node comprise:

S610: Receiving, from a radio network node serving at least one UE, a message comprising information related to a level of interference of at least one interfering cell;

S620: selecting a set of most interfering cells; and

S630: determining a level of reduction by determining, for each interfering cell in the set of most interfering cells, a level of reduction of transmission activity of downlink signals, to be executed at a specific time and for a determined duration by a radio network node serving said at least one interfering cell.

A detailed description on how steps S610, 620 and S630 are performed and by what means of the network node have already been thoroughly described and are therefore not repeated unnecessarily. The additional involved functions and steps performed by the network node, according to exemplary embodiments of the present invention, such as rating etc. have also already been described and are therefore not repeated again.

Figure 7:
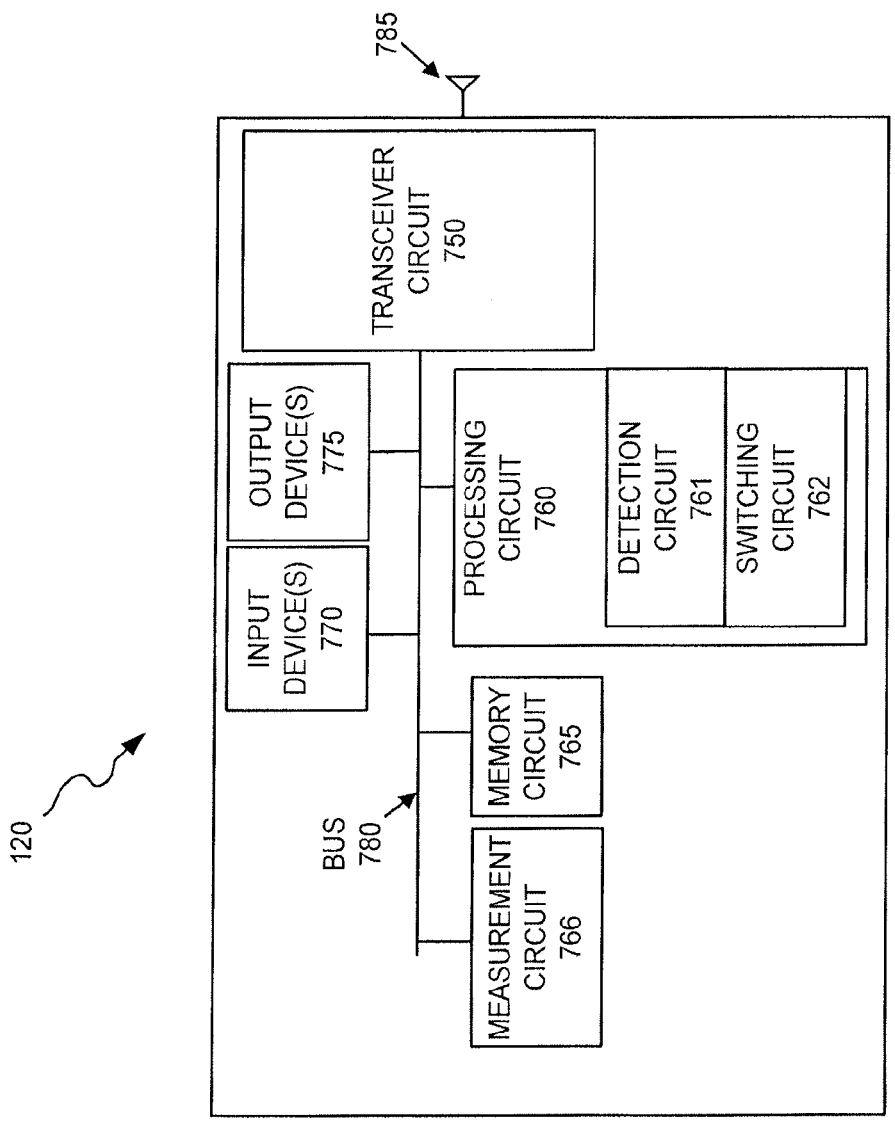
FIG. 7 is a block diagram illustrating a user equipment according to an embodiment of the present invention.

Referring now to FIG. 7, there is illustrated a block diagram of exemplary components of a user equipment, UE 120. As illustrated, the UE comprises an antenna 785, a transceiver circuit/unit 750, processing logic circuit/unit 760, a memory circuit/unit 765, an input device(s) circuit/unit 770, an output device(s) circuit/unit 775, and a bus 780 to which the circuit/units 785, 750, 760, 770 and 775 are connected.

Antenna 785 includes one or more antennas to transmit and/or receive radio frequency (RF) signals over the air interface. Antenna 785 may, for example, receive RF signals from transceiver circuit 750 and transmit the RF signals over the air interface to radio network nodes i.e. radio base stations e.g. eNodeBs and receive RF signals over the air interface from radio base stations and provide the RF signals to transceiver circuit 750.

Transceiver circuit 750 may include, although not shown, for example, a transmitter that may convert baseband signals from processing logic circuit 760 to RF signals and/or a receiver that may convert RF signals to baseband signals. Alternatively, transceiver circuit 750 includes a transceiver to perform functions of both a transmitter and a receiver. Transceiver 750 connects to antenna 785 for transmission and/or reception of the RF signals.

Processing logic circuit 760 includes a processor, microprocessor, an application specific integrated circuit (ASIC), field programmable gate array (FPGA), or the like. Processing logic 560 controls the operation of UE 120 and its components.

Memory circuit 765 includes a random access memory (RAM), a read only memory (ROM), and/or another type of memory to store data and instructions that may be used by processing logic 760. Input device(s) 770 include mechanisms for entry of data into UE 120. For example, input device(s) 770 may include input mechanisms, such as a microphone, input elements, a display, etc. Output device(s) 775 includes mechanisms for outputting data in audio, video and/or hard copy format. For example, output device(s) 775 may include a speaker, a display, etc.

Although FIG. 7 shows exemplary components of UE 120, in other implementations, UE 120 may contain fewer, different, or additional components than depicted in FIG. 7. The terminology UE includes, but should not be limited to, a mobile station, a fixed or mobile subscriber unit, a pager, a cellular telephone, a personal digital assistant (PDA), a computer, or any other type of user device capable of operating in a wireless communication.

According to exemplary embodiments of the present invention, the UE 120 further comprises, as shown in FIG. 7, a measurement or measuring circuit 766, a detection or determination circuit/unit 761 and a switching circuit/unit 762. The detection circuit 761 and the switching circuit 762 are shown as integral part of the processing logic 760. However this is not necessary. For example, the detection circuit 761 and/or the switching circuit 762 can instead be connected to the processing logic circuit 760.

According to exemplary embodiments of the present invention, the UE 120 which is served by a radio network node i.e. eNodeB accordance to previously described embodiments, is configured to perform positioning measurements on at least three interfering cells or on at least three interfering radio network nodes serving the at least three cells. Again, the serving radio network may or may not be one of the interfering radio network nodes. In order to perform the positioning measurements, the UE 120 is configured, by means of measuring circuit 766, to measure a reference signal from the interfering cells. The reference signal can be positioning reference signal (PRS) and/or cell-specific reference signal (CRS) as previously described. The detection circuit 762 is then configured to detect, for each interfering cell, an absence of a PRS indicative of a reduction in transmission activity from the interfering cells. The switching circuit 762 is configured to switch from measuring positioning measurements on PRS to measure on a CRS for each interfering cell and the measuring circuit 766 is configured to measure on CRS for each interference cell.

It should be mentioned that in state of the art solutions, when PRS are not transmitted in a neighbour cell due to reduced transmission activity, the UE will not perform positioning measurement such as time difference of arrival or reference signal time difference from the cells with reduced activity. Furthermore, the positioning subframes are designed to have low interference, e.g. data transmissions are not allowed in general while CRS signals are still transmitted. According to this embodiment the UEs could choose to measure on CRS without waiting for the next positioning occasion. Hence the UE, according to the exemplary embodiments of the present invention, upon detection of the absence of PRS, i.e. when transmission activity is reduced in a neighbour cell, performs positioning measurement over CRS. The UE therefore switches between PRS and CRS for collecting measurement samples depending upon their availability. The aggregated measurement can be averaged of the measurement samples based on PRS, when they are present, and the measurement samples based on CRS, when PRS are absent. This way measurement accuracy can be improved and/or measurement can be done/performed over short or shorter time. The exemplary embodiments of the present invention thus allow improvement in the positioning measurement performance and improvement in accuracy. In addition the UE:s power consumption as well as complexity are reduced since the UE can detect cells easily and the positioning measurements can be done in a short time.

Figure 8:
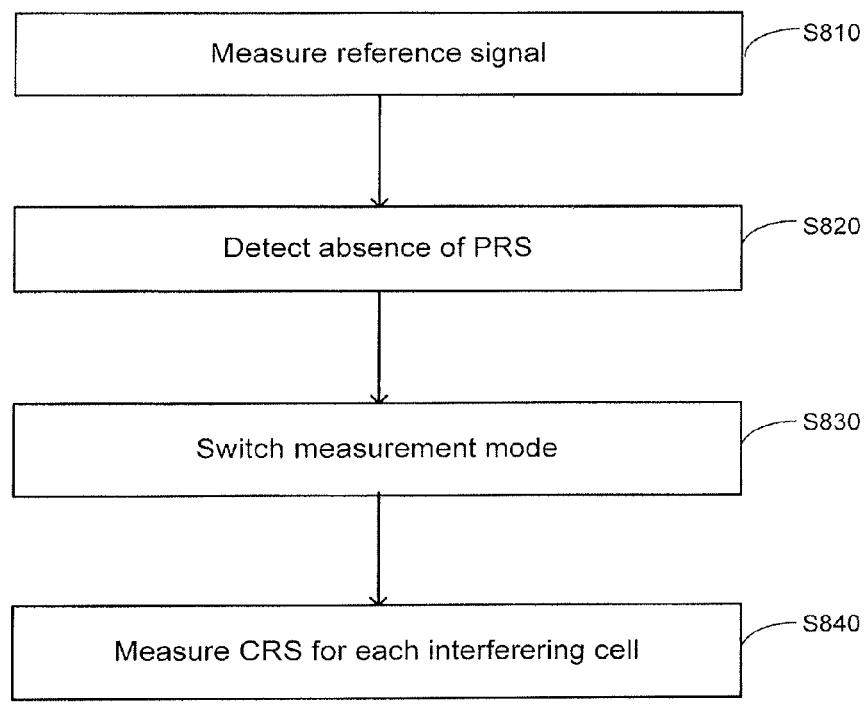
FIG. 8 is a flowchart illustrating method steps performed by a user equipment according to embodiments of the present invention.

Referring to FIG. 8, there is depicted a summary of main steps performed by UE in accordance with the above described exemplary embodiments of the present invention. The main steps performed by the UE comprise:

S810: Measuring a reference signal from the interfering cells and for each interfering cell, S820: detecting an absence of a positioning reference signal (i.e. FRS), indicative of a reduction in transmission activity from the interfering cells; and S830: switching measurement mode i.e. switching from measuring positioning measurements on PRS to S840: measuring on a CRS for each interfering cell.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP LTE has been used in this disclosure to exemplify the invention, this should not be seen as limiting the scope of the invention to only the aforementioned system. Other wireless systems, including LTE-A (or LTE-Advanced), UMTS, WiMax, and wireless LAN, may also benefit from exploiting the ideas covered within this disclosure.

The invention claimed is:

1. A method in a user equipment, for performing positioning measurements using a signal received from an interfering cell, the method comprising:

measuring positioning information using a first occasion of a positioning reference signal (PRS) received from a cell;

attempting to measure a second occasion of the PRS;

detecting an absence of the second occasion of the PRS, the absence of the second occasion of the PRS indicative of a reduction in transmission activity from the cell; and in response to detecting the absence of the PRS, measuring positioning information using a cell-specific reference signal (CRS) before a next occasion of the PRS.

2. The method of claim 1, comprising aggregating positioning information measured using the PRS with positioning information measured using the CRS.

3. A user equipment, configured to perform positioning measurements using a signal received from an interfering cell, comprising:
   a measuring circuit, configured to measure positioning information using a positioning reference signal (PRS) received from a cell and using a cell-specific reference signal (CRS) received from the cell;
   a detection circuit configured to detect an absence of the PRS, the absence of the PRS indicative of a reduction in transmission activity from the cell; and
   a switching circuit configured to switch from measuring positioning information using the PRS, to measuring positioning information using the CRS, the switching occurring upon detecting the absence of the PRS and before a next occasion of the PRS.

4. The user equipment of claim 3, the measuring circuit configured to aggregate positioning information measured using the PRS with positioning information measured using the CRS.

* * * * *